(12) United States Patent
Miyamae et al.

(10) Patent No.: US 10,617,960 B2
(45) Date of Patent: Apr. 14, 2020

(54) INFORMATION PROCESSING DEVICE, NON-TRANSITORY COMPUTER-READABLE MEDIUM, AND INFORMATION PROCESSING METHOD

(71) Applicant: DeNA Co., Ltd., Shibuya-ku, Tokyo (JP)

(72) Inventors: Kimihiko Miyamae, Tokyo (JP); Juhyun Kim, Tokyo (JP); Jun Morita, Tokyo (JP); Kiharu Shishikura, Tokyo (JP); Toshihiko Sasaki, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 57 days.

(21) Appl. No.: 15/949,333

(22) Filed: Apr. 10, 2018

(65) Prior Publication Data
US 2018/0304158 A1 Oct. 25, 2018

(30) Foreign Application Priority Data

Apr. 19, 2017 (JP) ................ 2017-083244

(51) Int. Cl.
| | | |
|---|---|---|
| *A63F 13/822* | (2014.01) | |
| *A63F 13/44* | (2014.01) | |
| *A63F 13/52* | (2014.01) | |
| *A63F 13/69* | (2014.01) | |

(Continued)

(52) U.S. Cl.
CPC ............ *A63F 13/822* (2014.09); *A63F 13/44* (2014.09); *A63F 13/52* (2014.09); *A63F 13/533* (2014.09);

(Continued)

(58) Field of Classification Search
CPC ........ A63F 13/822; A63F 13/44; A63F 13/52; A63F 13/58; A63F 13/69; A63F 13/79
See application file for complete search history.

(56) References Cited

U.S. PATENT DOCUMENTS

| | | | |
|---|---|---|---|
| 2007/0060335 A1* | 3/2007 | Sakaguchi | A63F 13/10 463/30 |
| 2017/0106291 A1* | 4/2017 | Suzuki | A63F 13/822 |

FOREIGN PATENT DOCUMENTS

| | | |
|---|---|---|
| JP | 2007-105309 A | 4/2007 |
| JP | 2010-051514 A | 3/2010 |

(Continued)

OTHER PUBLICATIONS

Office Action for related Japanese Patent Application 2017-083244, dated Jun. 6, 2017; English translation provided; 6 pages.

(Continued)

*Primary Examiner* — William H McCulloch, Jr.
*Assistant Examiner* — Yingchuan Zhang
(74) *Attorney, Agent, or Firm* — Procopio, Cory, Hargreaves & Savitch LLP

(57) ABSTRACT

A device and method include: determining the action content of each character engaged in battle by allowing the player to perform an operation whereby an arbitrary item not selected by the opponent is selected from a group of common items, and an operation whereby the selected item is associated with the player's battle character, while allowing the opponent to perform an operation, whereby an arbitrary item not selected by the player is selected from the group, and an operation whereby the selected item is associated with the opponent's battle character; determining the action order of the characters based on an action speed parameter configured for each respective character engaged in battle; and, upon selection of all the items from the group, causing each character engaged in battle to act based on the character action content corresponding to the respectively associated items in accordance with the determined action order.

14 Claims, 12 Drawing Sheets

(51) Int. Cl.
    *A63F 13/79*     (2014.01)
    *A63F 13/58*     (2014.01)
    *A63F 13/533*     (2014.01)
    *A63F 13/335*     (2014.01)
    *A63F 13/2145*     (2014.01)

(52) U.S. Cl.
    CPC .............. *A63F 13/58* (2014.09); *A63F 13/69* (2014.09); *A63F 13/79* (2014.09); *A63F 13/2145* (2014.09); *A63F 13/335* (2014.09)

(56) References Cited

FOREIGN PATENT DOCUMENTS

| | | |
|---|---|---|
| JP | 2010-104651 A | 5/2010 |
| JP | 2015-216940 A | 12/2015 |
| JP | 2016-039866 A | 3/2016 |
| JP | 2017-012257 A | 1/2017 |
| JP | 6067762 B2 | 1/2017 |

OTHER PUBLICATIONS

"Kingdom Hearts Birth by Sleep", Famitsu PSP+PS3, Enterbrain, Inc., Feb. 1, 2010, vol. 15 No. 1.

"Yo-Kai Sangokushi", Dengeki Nintendo, Kadokawa Corp., Mar. 19, 2016, vol. 16, No. 5.

NoSmith, "World Cross Saga (Wakusaga) Fantasy of a New Revolutionary Fun RPG! Outstanding strategic texture in an innovative battle that makes it possible to specify the order of action!", Appget, [online], Jan. 5, 2017 [date searched: May 25, 2017].

\* cited by examiner

FIG. 3

| Character ID | Character Name | Attributes | Skills | Special Skills | Special Attacks | Maximum Attack Strength | Maximum Defense Strength | Maximum Hit Point Value | Maximum Speed | Initial Attack Strength | Initial Defense Strength | Initial Hit Point Value | Initial Speed |
|---|---|---|---|---|---|---|---|---|---|---|---|---|---|
| 001 | Character A | Attribute A | Skill A | Special Skill A | Special Attack A | 1500 | 800 | 1000 | 50 | 15 | 8 | 10 | 5 |
| 002 | Character B | Attribute B | Skill B | Special Skill B | Special Attack B | 3000 | 2000 | 1500 | 100 | 30 | 20 | 15 | 10 |
| 003 | Character C | Attribute C | Skill C | Special Skill C | Special Attack C | 4500 | 3000 | 2500 | 200 | 45 | 30 | 25 | 20 |
| 004 | Character D | Attribute D | Skill D | Special Skill D | Special Attack D | 6000 | 5500 | 6000 | 500 | 60 | 55 | 60 | 50 |
| . | . | . | . | . | . | . | . | . | . | . | . | . | . |

FIG 4

| Player ID | Player Name | Level | Proprietary Character Information | Player Deck Information |
|---|---|---|---|---|
| 001 | Player A | 10 | Proprietary Character Information (1) | Player Deck Information (1) |
| 002 | Player B | 20 | Proprietary Character Information (2) | Player Deck Information (2) |
| . | . | . | . | . |

FIG. 5

| | Proprietary Character Information (2) | | | | | |
|---|---|---|---|---|---|---|
| Proprietary Character Information (1) | | | | | | |
| Character ID | Level | Attack Strength | Defense Strength | Hit Point Value | Speed | |
| 0011 | Lv.3 | 15 | 10 | 200 | 5 | |
| 0211 | Lv.4 | 22 | 40 | 600 | 6 | |
| 0133 | Lv.7 | 60 | 50 | 250 | 15 | |
| . . . | . . . | . . . | . . . | . . . | . . . | |

FIG. 6

| Deck Frame | Constituent Characters | Frame Attributes | Action Content | Charge Points |
|---|---|---|---|---|
| 1: Leader Frame | 0025 | - | 1: Attack 2: - 3: - | 10 |
| 2: Member Frame | 0036 | Attribute A | 1: Skill 2: - 3: - | 0 |
| 3: Member Frame | 0014 | Attribute A | 1: Charge 2: Charge 3: - | 50 |
| | | | | |

FIG. 7

| Quest ID | Quest Title | Level | Enemy Deck Information |
|---|---|---|---|
| 0001 | Quest A | 10 | Enemy deck information (1) |
| 0002 | Quest B | 20 | Enemy deck information (2) |
| . . . | . . . | . . . | . . . |

FIG. 8

| Deck Frame | Constituent Characters | Attack Strength | Defense Strength | Hit Point values (HP) | Speed | Frame Attributes | Action Content | Charge Points |
|---|---|---|---|---|---|---|---|---|
| 1: Leader Frame | 0124 | 1800 | 1800 | 1800 | 80 | - | 1: Attack 2: - 3: - | 0 |
| 2: Member Frame | 0246 | 1000 | 1200 | 800 | 50 | Attribute D | 1: Skill 2: - 3: - | 0 |
| 3: Member Frame | 0369 | 800 | 800 | 1000 | 10 | Attribute D | 1: Attack 2: - 3: - | 10 |
| . . . | . . . | . . . | . . . | . . . | . . . | . . . | . . . | . . . |

| Item ID | Item Name | Action Content | Awarded Points |
|---|---|---|---|
| 1 | Item A | Attack | Charge Points (+1) |
| 2 | Item B | Skill | - |
| 3 | Item C | Charge | Charge Points (+2) |

| Order of Action | Acting Character | Action Content | Attack Target | Deck Affiliation |
|---|---|---|---|---|
| No. 1 | Character A | Skill | Character E | Player Deck |
| No. 2 | Character F | Charge | - | Enemy Deck |
| No. 3 | Character B | Attack | Character G | Player Deck |
| No. 4 | Character J | - | - | Enemy Deck |
| No. 5 | Character D | Attack | Character F | Player Deck |
| . | . | . | . | . |
| . | . | . | . | . |
| . | . | . | . | . |

INFORMATION PROCESSING DEVICE, NON-TRANSITORY COMPUTER-READABLE MEDIUM, AND INFORMATION PROCESSING METHOD

This application claims foreign priority under 35 USC 119 based on Japanese Patent Application No. 2017-083244, filed on Apr. 19, 2017, the contents of which is incorporated herein in its entirety by reference.

BACKGROUND

1. Field

The present invention relates to an information processing device, a non-transitory computer-readable medium including instructions to be performed on a processor, wherein the instruction may be associated with a game, and an information processing method.

2. Related Art

There is a well-known information processing device used to run battle games in which a player and the opponent, after registering their own characters in each of multiple panels scrolling from right to left in a lane, carry out attacks against the respective opponent in sequence, starting from the characters registered in the panel arriving at the leftmost end of the lane (for example, see Patent Document 1).

PRIOR ART DOCUMENTS

Patent Documents

[Patent Document 1]
  Japanese Patent Publication No. 6,067,762.

SUMMARY

In such an information processing device, the order of action of the characters is determined by the fact that the player and the player's opponent compete to take turns carrying out attacks. However, if the order of action of the characters is determined by competing to take turns, there is a risk of weakening the players' interest and excitement because the characters can only act in accordance with this order of action.

The present invention has been devised with these circumstances in mind and it is an object of the invention to improve strategic texture and increase the players' interest and excitement by enabling the competitive selection of character action content.

The primary invention of the present invention for solving the above-described problems is an information processing device, which is provided with: an action content determination processing module, which determines the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while, at the same time, allowing the opponent to perform an operation whereby an arbitrary item that has not been selected by the player is selected from the group of common items and an operation whereby this selected item is associated with the opponent's own character used in battle;

an order-of-action determination processing module, which determines the order of action of the characters based on the action speed parameter configured for each respective character engaged in battle; and an action content execution processing module, which, upon selection of all the items from the group of common items, causes each character engaged in battle to act based on the character action content corresponding to the respectively associated items in accordance with the determined order of action of the characters.

Other features of the present invention will become apparent from the present Specification and the accompanying Drawings.

BRIEF DESCRIPTION OF THE DRAWINGS

FIG. 3
A diagram illustrating an exemplary data structure of character information.
FIG. 4
A diagram illustrating an exemplary data structure of player information.
FIG. 5
A diagram illustrating an exemplary data structure of proprietary character information.
FIG. 6
A diagram illustrating an exemplary data structure of player deck information.
FIG. 7
A diagram illustrating an exemplary data structure of quest information.
FIG. 8
A diagram illustrating an exemplary data structure of enemy deck information.

Figure 1:
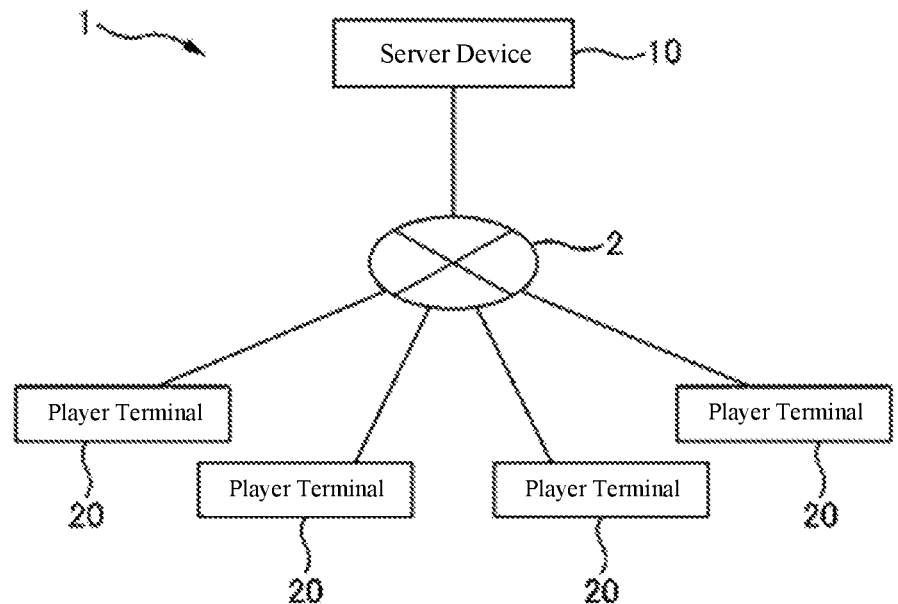
FIG. 1
A diagram illustrating an exemplary configuration of the entire game system 1.

A diagram illustrating a first specific example of character action content determination.

FIG. 18

A diagram illustrating a second specific example of character action content determination.

DETAILED DESCRIPTION

At least the following will become apparent from the present Specification and the accompanying Drawings.

Specifically, there is an information processing device, which is provided with: an action content determination processing module, which determines the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while, at the same time, allowing the opponent to perform an operation whereby an arbitrary item that has not been selected by the player is selected from the group of common items and an operation whereby this selected item is associated with the opponent's own character used in battle; an order-of-action determination processing module, which determines the order of action of the characters based on the action speed parameter configured for each respective character engaged in battle; and an action content execution processing module, which, upon selection of all the items from the group of common items, causes each character engaged in battle to act based on the character action content corresponding to the respectively associated items in accordance with the determined order of action of the characters.

Such an information processing device makes it possible to determine the action content of each character engaged in battle by means of the competitive selection of items (character action content) from a group of common items in a non-duplicated manner. Thus, for example, when a player first selects an item, to which certain action content corresponds, even though the order of action of the opponent's own character has priority, the opponent's character is no longer allowed to act based on the action content corresponding to this already-selected item. Therefore, it becomes possible to increase the players' interest and excitement because such a strategy can be used even if the order of action of the characters has been decided.

In addition, in such an information processing device, there may be provided an image generation processing module that generates a game screen having an item group placement area where the multiple items contained in the group of common items are placed side-by-side and a player character placement area where the player's own multiple characters used in battle by the player are placed side-by-side; and, while the game screen is displayed, the aforementioned action content determination processing module may allow the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus may determine the action content of the player's own selected character.

When such an information processing device is used, the player, by looking at a game screen, can readily select an item that has not been selected by the opponent from a group of common items and, at the same time, can readily select the player's own character associated with this item.

In addition, in such an information processing device, the image generation processing module may generate the aforementioned game screen that, furthermore, has an order-of-action display area, which includes a player-side area and an opponent-side area, and in which the order of action of each character engaged in battle determined by the order-of-action determination processing module is displayed in a subdivided manner on the player's side and on the opponent's side, and, whenever the player performs an operation whereby the player's own character associated with an item selected from the item group placement area is selected from the player character placement area, an icon showing the player's own selected character may be placed in the player-side area of the order-of-action display area in a side-by-side arrangement in accordance with the order of action.

When such an information processing device is used, the player, upon performing a selection operation, can readily identify the order of action of the player's own character associated with the item by simply looking at the icons placed in the player-side area of the order-of-action display area.

In addition, in such an information processing device, the action content determination processing module may allow the player to perform an operation that associates two or more items selected from the group of common items with one of the player's own characters, thereby determining two or more action content elements for the player's own character, and the action content execution processing module may cause the player's own character to act based on the character action content corresponding to the first item during the first pass when the actions of each character engaged in battle are initially carried out, and may cause the player's own character to act based on the character action content corresponding to the second and subsequent items during the second and subsequent passes following the first pass.

When such an information processing device is used, the number of items associated with one of the player's own characters is not limited to one, and, therefore, depending on the battle situation, the player can associate two or more items with one of the player's own characters.

In addition, in such an information processing device, there may be provided an image generation processing module that generates a game screen having an order-of-action display area that shows the order of action of each character engaged in battle as determined by an order-of-action determination processing module, and, upon performing an operation that associates two or more items selected by the player from the group of common items with one of the player's own characters, the image generation processing module, in accordance with the order of action, may place an icon that shows one of the player's own characters performing an action corresponding to the first item in the area of the order-of-action display area that corresponds to the first pass, and, in accordance with the order of action, may place icons that show one of the player's own characters performing actions corresponding to the second and subsequent items in the areas of the order-of-action display area that correspond, respectively, to the second and subsequent passes.

When such an information processing device is used, the player, upon performing a selection operation, can readily identify the pass during which one of the player's own characters having two or more items associated therewith is supposed to act by simply looking at the icons placed in the order-of-action display area.

In addition, in such an information processing device, the image generation processing module may generate a game screen additionally having an item group placement area where the multiple items contained in the group of common items are placed side-by-side and a player character placement area where the player's own multiple characters used in battle by the player are placed side-by-side; and, while the game screen is displayed, the action content determination processing module may allow the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus may determine the action content of the player's own selected character.

When such an information processing device is used, the player, by looking at a game screen, can readily select an item that has not been selected by the opponent from a group of common items and, at the same time, can readily select the player's own character associated with this item.

In addition, in such an information processing device, the action content determination processing module may vary the number of items used in the group of common items depending on at least either the number of the player's own characters used in battle by the player or the number of the opponent's own characters used in battle by the opponent.

When such an information processing device is used, the player and the player's opponent can engage in battle in an equitable manner because the balance between the number of characters used in battle and the number of items selectable from the group of common items is regulated.

Further, there is a non-transitory computer-readable medium including instructions to be performed on a processor for a game, directing a computer to execute an action content determination process, which determines the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while, at the same time, allowing the opponent to perform an operation whereby an arbitrary item that has not been selected by the player is selected from the group of common items and an operation whereby this selected item is associated with the opponent's own character used in battle;

an order-of-action determination process, which determines the order of action of the characters based on the action speed parameter configured for each respective character engaged in battle; and an action content execution process, whereby, upon selection of all the items from the group of common items, each character engaged in battle is caused to act based on the character action content corresponding to the respectively associated items in accordance with the determined order of action of the characters.

When such a non-transitory computer-readable medium including instructions to be performed on a processor for a game is used, strategic texture can be improved and the players' interest and excitement can be increased by enabling the competitive selection of character action content.

Further, there is an information processing method wherein a computer determines the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while, at the same time, allowing the opponent to perform an operation whereby an arbitrary item that has not been selected by the player is selected from the group of common items and an operation whereby this selected item is associated with the opponent's own character used in battle;

determines the order of action of the characters based on the action speed parameter configured for each respective character engaged in battle; and, upon selection of all the items from the group of common items, causes each character engaged in battle to act based on the character action content corresponding to the respectively associated items in accordance with the determined order of action of the characters.

When such an information processing method is used, strategic texture can be improved and the players' interest and excitement can be increased by enabling the competitive selection of character action content.

Embodiment

«Regarding the Configuration of Game System 1»

FIG. 1 is a diagram illustrating an exemplary configuration of the entire game system 1. The game system 1 provides various game-related services to the player over a network 2 (for example, the Internet) and includes a server device 10 and multiple player terminals 20.

The game system 1 according to the present embodiment can provide players with a battle game played using game content. The description below is in reference to a battle-type card game played using character cards (hereinafter referred to simply as "characters"), which represent an example of game content.

The battle-type card game of the present embodiment is a battle game in which two sets of decks made up of multiple characters engage in battle on a game field. In this battle game, a deck assembled by a player (hereinafter referred to as the "player deck") is engaged in battle with a deck assembled by an opponent (a computer (NPC) or another player) (hereinafter referred to as the "enemy deck").

In this battle game, battles are conducted using a round-based (turn-based) system in which a phase involving determination of action content for each character forming part of the player deck and enemy deck and a phase involving actual action based on the determined action content are combined into a single round.

In this battle game, the order of action of the characters forming part of the player deck and enemy deck is determined in advance before the start of the battle. For this reason, during each round, the actual actions of each character forming part of the player deck and enemy deck are based on this order of action determined in advance.

These round-based battles are conducted repeatedly until either the player deck or the enemy deck is completely destroyed. Namely, the player can win by defeating all the characters forming part of the opponent's enemy deck.

«Regarding the Configuration of Server Device 10»

Figure 2:
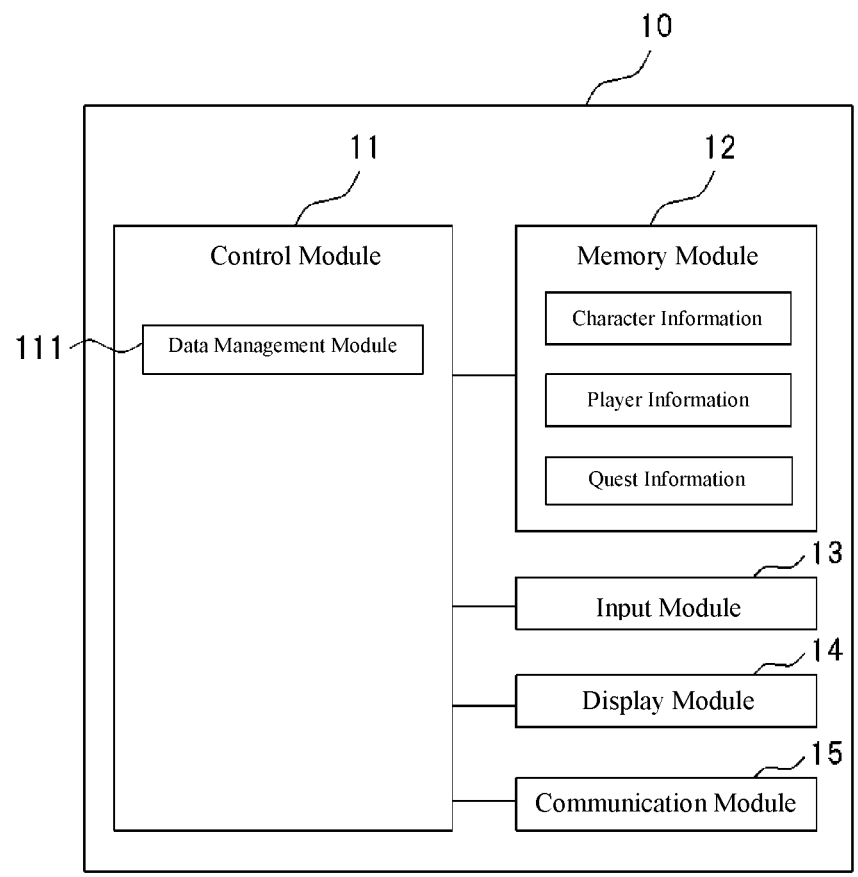
FIG. 2
A block diagram illustrating the functional configuration of the server device 10.

FIG. 2 is a block diagram illustrating the functional configuration of the server device 10. The server device 10 is an information processing device (e.g., a workstation, a personal computer, etc.) used by a system administrator to operate and manage various services. Upon receiving various commands (requests) from the player terminals 20, the server device 10 transmits (responds) non-transitory computer-readable medium including instructions to be performed on a processor for a game (e.g., game programs) and various types of data that are operational on the player terminals 20. The server device 10 has a control module 11 providing overall control over the server device 10, a memory module 12 storing various types of data and a non-transitory computer-readable medium including instructions to be performed on a processor (e.g., one or more software programs), an input module 13 used by a system administrator, etc., for entering various types of data, a display module 14 displaying operation screens, and a communication module 15 communicating information to and from the player terminals 20.

The control module 11 according to the present embodiment is provided with at least a data management module 111. The data management module 111 possesses functionality to execute the processing operations required to manage various types of data transmitted to and received from the player terminals 20. The memory module 12 according to the present embodiment stores at least character information, player information, and quest information.

FIG. 3 is a diagram illustrating an exemplary data structure of character information. This character information has configured therein, in association with character IDs, at least character names, attributes, skills, special skills, and special attacks, as well as capability parameters, such as maximum attack strength, maximum defense strength, maximum hit point value (maximum HP), maximum speed, initial attack strength, initial defense strength, initial hit point value (initial HP), initial speed, and the like. The skills represent information indicating the unique techniques that this character possesses, such as HP recovery, attack strength boosting, lethal techniques, and the like. The special skills represent information indicating unique techniques that are more efficient than ordinary skills. The special attacks represent information indicating attacks that are stronger than ordinary attacks executed by this character. The maximum speed is the maximum value of the parameter (action speed parameter) indicating the speed of action of this character. The initial speed is the initial value of the parameter indicating the speed of action of the character. The faster the speed of the character is, the sooner its turn to act during a battle arrives.

FIG. 4 is a diagram illustrating an exemplary data structure of player information. This player information has configured therein, in association with character IDs, at least a player name, a level, proprietary character information, and player deck information.

FIG. 5 is a diagram illustrating an exemplary data structure of proprietary character information. The proprietary character information represents information relating to characters belonging to the players (hereinafter referred to as "proprietary characters"). This proprietary character information has configured therein, in association with the character IDs of the proprietary characters, the current values of various parameters for, at least, level, attack strength, defense strength, hit point values, and speed.

FIG. 6 is a diagram illustrating an exemplary data structure of player deck information. The player deck information represents information relating to the deck assembled by the player. This player deck information has configured therein, in association with deck frames, at least the constituent characters, frame attributes, action content, and charge points. The deck frames are made up of a single leader frame and multiple member frames. Here, there are five deck frames configured, including a leader. The constituent characters, which represent information indicating the proprietary characters forming part of the player's deck, are associated with the deck frames. The frame attributes represent information indicating the attributes configured in the deck frames. The attributes of the member frames are determined by the attributes of the character configured in the leader frame. In other words, the attributes of the member frames vary depending on what character is configured in the leader frame. Furthermore, configuring a character with the same attributes as the frame attributes in this deck frame makes it possible to increase the capability parameters of this character. The action content represents information indicating character action content. Here, up to three action content elements can be configured per one character. In the present embodiment, an item has action content configured therefor, and, consequently, up to three items can be associated with a single character. The charge points represent information indicating a charged point value. In the present embodiment, the character can activate special skills and special attacks when the charge point value reaches a maximum value (for example, 50 points).

FIG. 7 is a diagram illustrating an exemplary data structure of quest information. This quest information has configured therein, in association with quest IDs, at least a quest title, a level, and enemy deck information. The level represents information indicating the degree of difficulty of this quest. The enemy deck information represents information indicating the enemy deck appearing in this quest.

FIG. 8 is a diagram illustrating an exemplary data structure of enemy deck information. The enemy deck information represents information relating to the deck assembled by the player's opponent (a computer (NPC)). This enemy deck information has configured therein, in association with deck frames, at least constituent characters, attack strength, defense strength, hit point values, speed, and various other parameter values, frame attributes, action content, and charge point values.

«Regarding the Configuration of the Player Terminals 20»

Figures 9, 10:
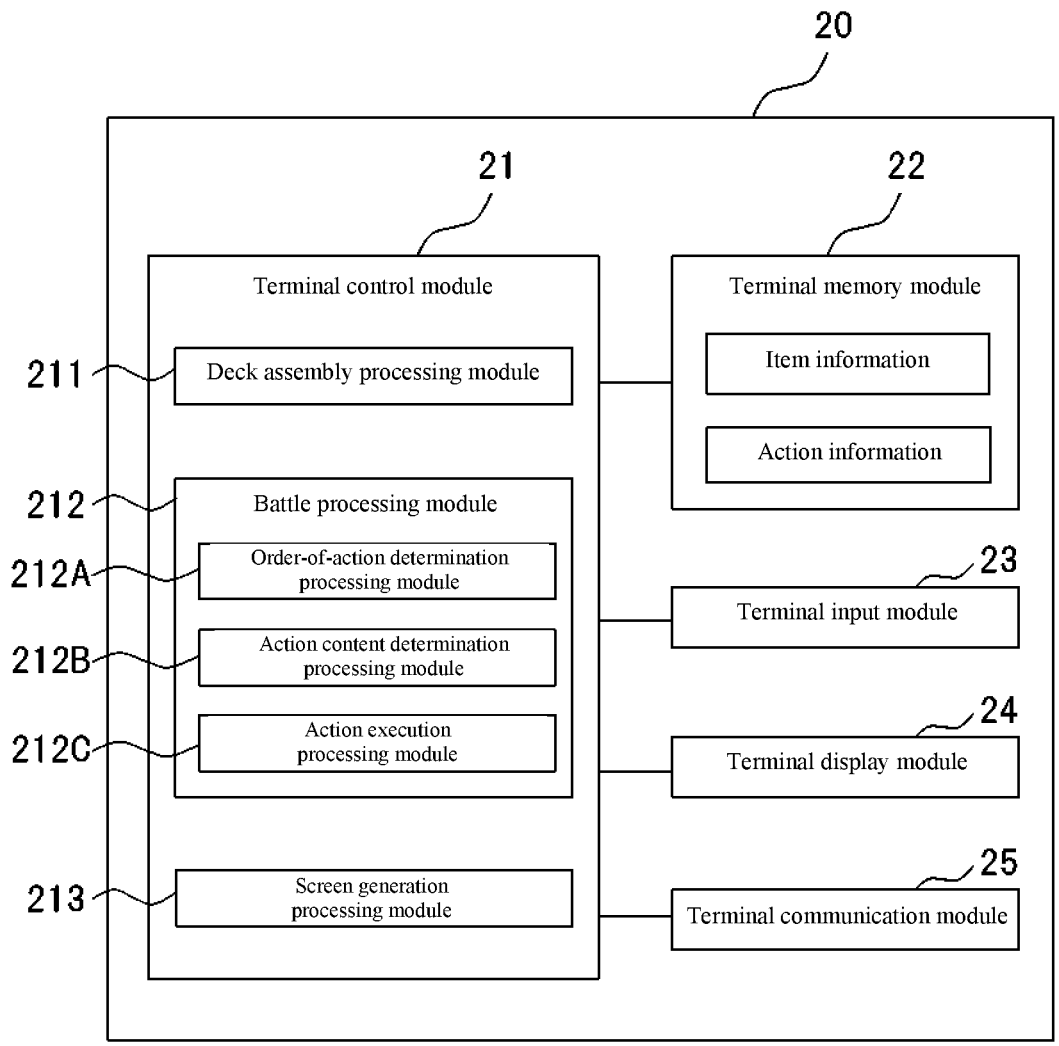
FIG. 9
A block diagram illustrating the functional configuration of the player terminal 20.
FIG. 10
A diagram illustrating an exemplary data structure of item information.

FIG. 9 is a block diagram illustrating the functional configuration of a player terminal 20. In the present embodiment, the player terminals 20, which are the information processing devices used by the players during gameplay (e.g., smartphones, mobile phone terminals, tablet-type terminals, and the like), are interconnected so as to enable transmission and reception of game-related information of various types (game data, operating data, and the like) to and from the server device 10. The player terminal 20 has a terminal control module 21, a terminal memory module 22, a terminal input module 23, a terminal display module 24, and a terminal communication module 25.

The terminal control module 21, along with receiving and forwarding data between the modules, exercises overall control over the player terminal 20 and is implemented as a CPU (Central Processing Unit) that runs predetermined one or more non-transitory computer-readable media including instructions to be performed on a processor (e.g., programs) stored in memory. The terminal control module 21 of the present embodiment is provided with at least a deck assembly processing module 211, a battle processing module 212, and a screen generation processing module 213.

The deck assembly processing module 211 possesses functionality to execute the processing operations required to assemble a deck made up of multiple characters. A "deck" is a group of characters obtained by combining multiple characters into a single set. In response to the player's operations, the deck assembly processing module 211 according to the present embodiment assembles a player deck made up of the multiple characters owned by the player. It should be noted that the player deck may be assembled such that it includes characters that do not belong to the player.

The battle processing module 212 possesses functionality to execute the processing operations required to run a character battle in accordance with a non-transitory computer-readable medium including instructions to be performed on a processor for a game (e.g., game program). In response to the player's operations, this battle processing module 212 executes the processing operations required to pit the player deck assembled by this player against an enemy deck in order to determine the winner. The battle processing module 212 according to the present embodiment has an order-of-action determination processing module 212A, an action content determination processing module 212B, and an action content execution processing module 212C.

The order-of-action determination processing module 212A possesses functionality to execute the processing operations required to determine the order in which the characters act after the start of the battle. Before the start of the battle, the order-of-action determination processing module 212A according to the present embodiment uses the speed (action speed parameter) configured for each character to determine the order in which each character forming part of competitors' decks acts after the start of the battle.

The action content determination processing module 212B possesses functionality to execute the processing operations required to determine the content of character action after the start of the battle. The action content determination processing module 212B according to the present embodiment generates a group of items common to the player and the player's opponent using multiple types of various items, to which character action content respectively corresponds. The player is then allowed to perform an operation that selects an arbitrary item that has not been selected by the opponent from this group of common items and an operation to associate this selected item with a character in the player deck. In addition, the opponent is allowed to perform an operation that selects an arbitrary item that has not been selected by the player from this group of common items and an operation to associate this selected item with a character in the enemy deck. These operations are used to determine the action content of each character engaged in battle. In this manner, when the player and the player's opponent perform operations whereby items are competitively selected from the group of common items and are configured for each character in each respective deck, the action content corresponding to the configured items is determined as the action content of the characters engaged in battle with each other.

The action content execution processing module 212C possesses functionality to execute the processing operations required to cause the characters to act based on the action content corresponding to the items. Once all the items have been selected from the group of common items, the action content execution processing module 212C according to the present embodiment causes each character engaged in battle to act in accordance with the determined order of action of the characters based on the action content corresponding to the items.

The screen generation processing module 213 possesses functionality to execute the processing operations required to generate screen data used to display game screens on the terminal display module 24. The screen generation processing module 213 according to the present embodiment executes the processing operations required to generate, for example, a game screen used to assemble a player's deck used in battle, a game screen used for quest selection, a game screen used to select action content for player characters, and the like.

The terminal memory module 22, which is connected to the terminal control module 21 via a bus, performs the processing operations required to look up, read out, and re-write stored data in response to commands from the terminal control module 21. This terminal memory module 22, which is implemented, for example, as a flash memory or a hard disk, etc., stores at least item information relating to the items used in battle, action information relating to the actions of the characters engaged in battle, and character information, quest information, and player information, etc., downloaded from the server device 10.

FIG. 10 is a diagram illustrating an exemplary data structure of item information. This item information has configured therein, in association with item IDs, at least item names, action content, and awarded points. The action content represents information indicating the action corresponding to this item. There are three types of action content ("attack", "skill", "charge") configured here. The awarded points represent information indicating the number of charge points awarded after associating this item with a character. Here, after associating an item corresponding to "attack" with a character, this character is awarded "+1" in charge points. In addition, after associating an item corresponding to "charge" with a character, this character is awarded "+2" in charge points. Furthermore, no points are awarded after associating an item corresponding to "skill" with a character.

Figures 11, 12:
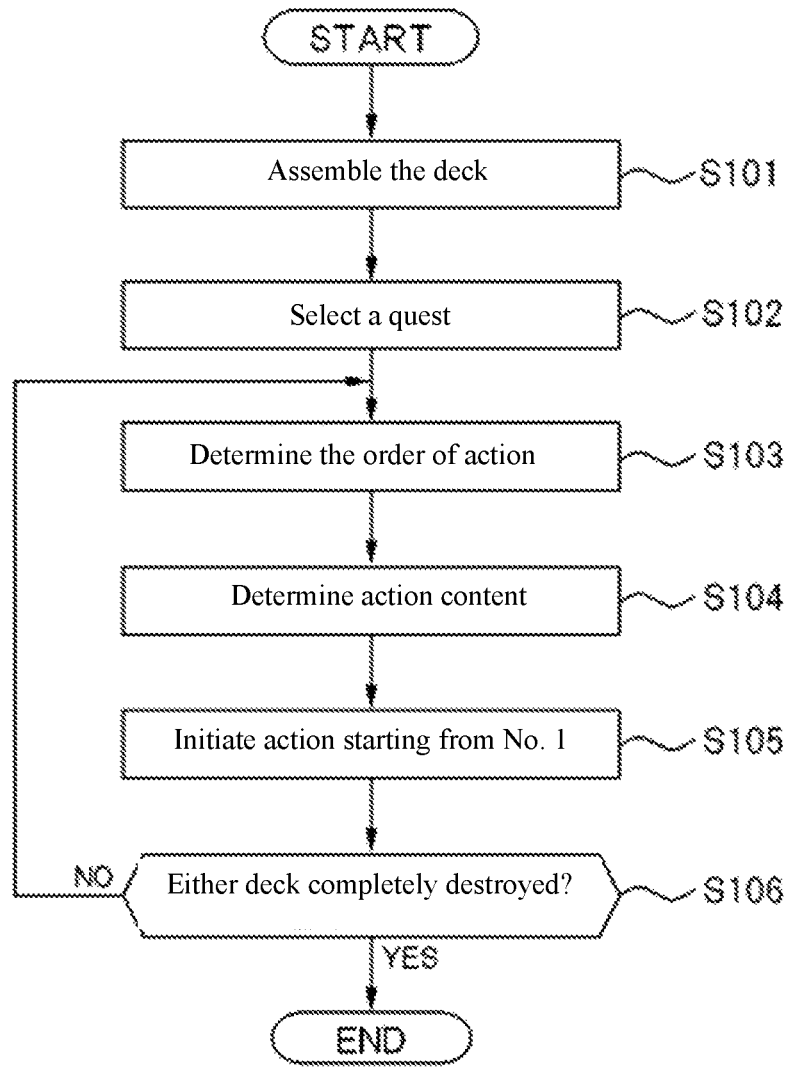
FIG. 11
A diagram illustrating an exemplary data structure of action information.
FIG. 12
A flow chart used to illustrate an example of operation of the game system 1.

FIG. 11 is a diagram illustrating an exemplary data structure of action information. This action information has configured therein at least the order of action, acting characters, action content, attack target, and deck affiliation. The order of action represents information indicating the order in which the characters act after the start of the battle. The acting characters represent information indicating the characters that act when their turn arrives. The action content represents information indicating the content of the characters' actions undertaken when their turn arrives. The attack target represents information indicating the opponent characters that are attack targets. The deck affiliation represents information indicating the deck, to which this acting character belongs.

The terminal input module 23, which is used by the player to perform various operations (game operations, etc.), is implemented, for example, in the form of control buttons, a touch panel, or the like. In the present embodiment, the player can designate various items and various characters on the game field, can select various buttons, etc., by performing game operations on a touchscreen panel.

The terminal display module 24, which is used to display game screens in response to commands from the terminal control module 21, is implemented, for example, in the form of a liquid crystal display (LCD: Liquid Crystal Display) or the like.

The terminal communication module 25, which operates as a transceiver for transmitting and receiving information of various types to and from the server device 10 over a network 2, is implemented, for example, as an NIC (Network Interface Card) or the like.

«Regarding the Operation of the Game System 1»

An example of operation of the game system 1 according to the present embodiment is illustrated hereinbelow. It should be noted that the discussion below refers to a case in which the player engages in gameplay with a computer (NPC) as the player's opponent.

<Overview of Operation>

FIG. 12 is a flow chart illustrating an example of operation of the game system 1 according to the present embodiment.

First, upon receiving a game operation that requests deck assembly from a player who wishes to take part in the battle game, the player terminal 20 performs the processing operations required to assemble a player deck used in battle (Step S101).

Specifically, upon receiving the player's game operation, the screen generation processing module 213 of the player terminal 20 generates a deck assembly screen 50, on which this player assembles a player deck from the player's own characters. Subsequently, the deck assembly screen 50 generated by the screen generation processing module 213 is displayed on the terminal display module 24.

Figure 13:
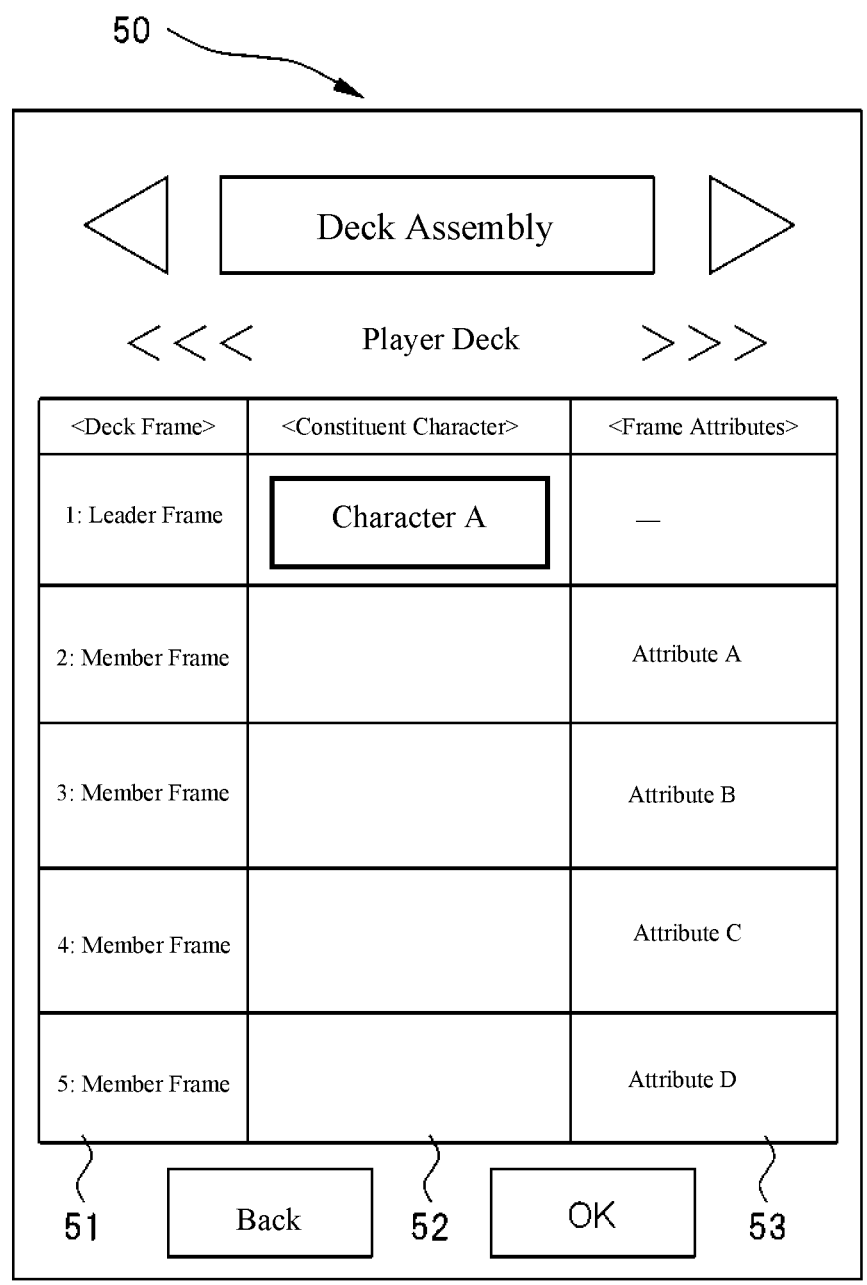
FIG. 13
A diagram illustrating an exemplary deck assembly screen 50.

FIG. 13 is a diagram illustrating an exemplary deck assembly screen 50. This deck assembly screen 50 includes a deck frame display area 51, a constituent character display area 52, and a frame attribute display area 53.

Multiple deck frames used to configure the constituent characters of the player deck are displayed in the deck frame display area 51. Since the present embodiment has five deck frames available, the player can assemble a player deck composed of five proprietary characters. The deck frames are made up of one "leader frame" and four "member frames".

The constituent characters of the player deck are displayed in the constituent character display area 52 in association with the deck frames. As shown herein, "Character A" selected by the player has been configured in the "leader frame". It should be noted that tapping a blank area where no characters have been placed yet in the constituent character display area 52 results in a transition to a screen that lists the player's own proprietary characters based on this player's proprietary player information. Accordingly, from this list, the player can select the characters to be respectively configured in each deck frame. In addition, tapping an area in which a character has already been configured results in a screen transition in the same manner. Accordingly, the player can also change the characters already configured in the deck frames by selecting other characters from this list.

The frame attributes configured in the deck frames are displayed in association with the deck frames in the frame attribute display area 53. Configuring characters having the same attributes as these frame attributes in the deck frames makes it possible for the configured characters to generate special effects. In the present embodiment, frame attributes are automatically configured in each of the remaining "member frames" based on the attributes possessed by the character configured in the "leader frame". Here, assuming that "Attribute A" has been configured for "Character A", when this "Character A" is configured in the "leader frame", the same "Attribute A" as in "Character A" is automatically configured in two "member frames", and "Attribute C", which is compatible with "Attribute A", is automatically configured in the remaining two "member frames". For this reason, for example, if "Character C", which has "Attribute C", is configured for a "member frame" whose frame attribute is "Attribute C", then the attack strength of this configured "Character C" is increased, or its attack range is expanded (generating special effects). In this manner, the properties of the player deck are determined depending on what kind of character is employed as the leader.

Subsequently, after configuring the characters in each deck frame in accordance with the player's selection operations while this deck assembly screen 50 is displayed on the terminal display module 24, the deck assembly processing module 211 of the player terminal 20 updates this player's player deck information based on the corresponding operational information.

Referring back to FIG. 12, after carrying out the player deck-related deck assembly process in this manner, the player terminal 20 performs the processing operations required to select a quest in which a battle is conducted using this player deck (Step S102).

Specifically, after assembling the player deck in accordance with the player's operations, the screen generation processing module 213 of the player terminal 20 generates a quest selection screen 55 that allows this player to select quests (game stages). The quest selection screen 55 generated by the screen generation processing module 213 is subsequently displayed on the terminal display module 24.

Figure 14:
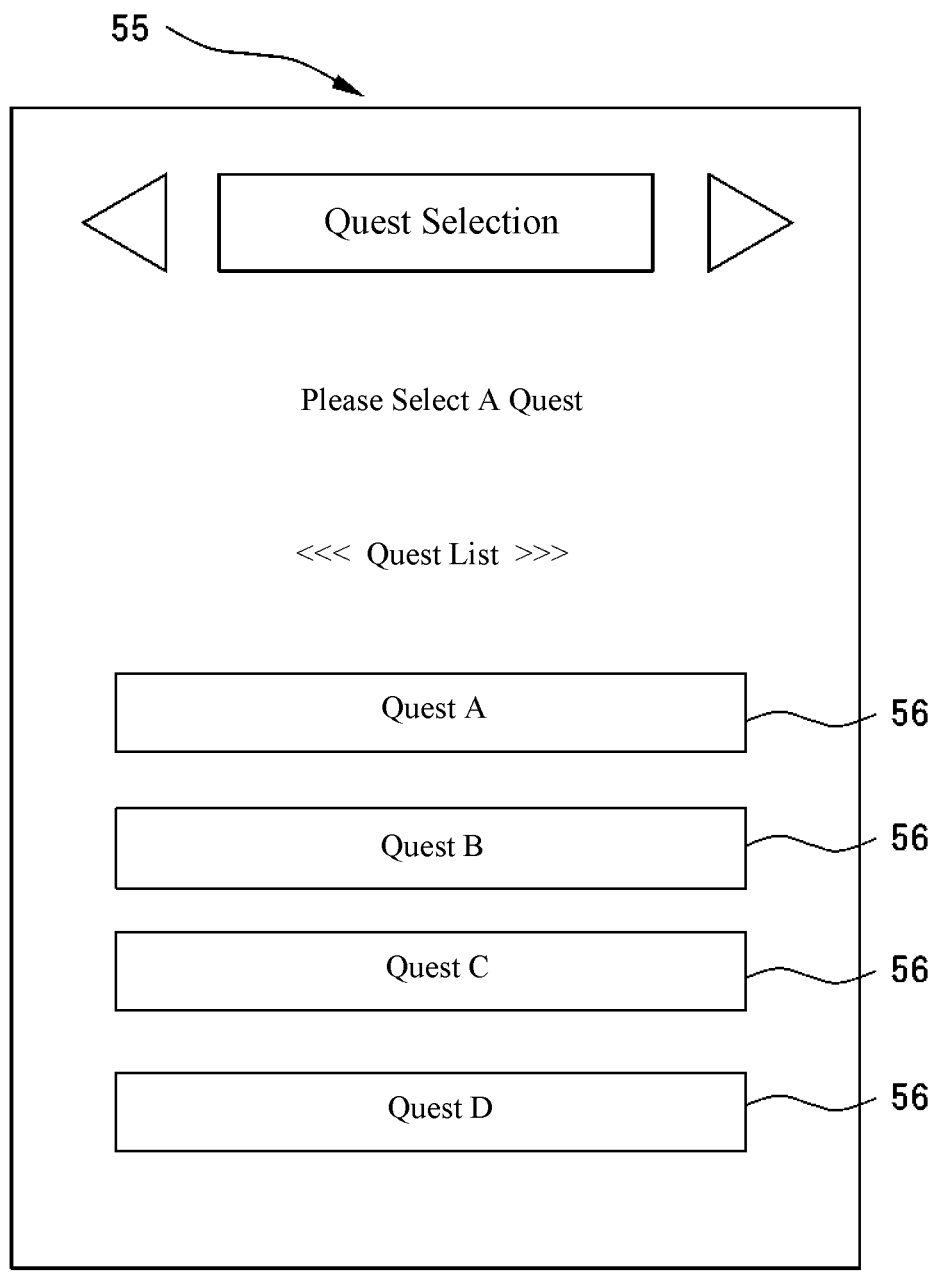
FIG. 14
A diagram illustrating an exemplary quest selection screen 55.

FIG. 14 is a diagram illustrating an example of the quest selection screen 55. This quest selection screen 55 provides a list view of quest (game stage) candidates. In this list, the player can designate a quest as the next challenge by selecting an arbitrary control button 56. The titles of the quests are respectively displayed on the control buttons 56.

Subsequently, after designating a particular quest from among the multiple listed quests in accordance with the player's selection operation while this quest selection screen 55 is displayed on the terminal display module 24, the battle processing module 212 of the player terminal 20 identifies the opponent's enemy deck of this player deck based on the enemy deck information in association with the designated quest. The enemy deck according to the present embodiment is made up of five enemy characters.

Referring back to FIG. 12, after selecting a particular quest in this manner, the player terminal 20 performs the processing operations required to determine the order (action order) in which each character contained in the respective player deck and enemy deck engaged in battle in the selected quest should act after the start of the battle (Step S103).

Specifically, before the start of the battle, the order-of-action determination processing module 212A of the player terminal 20 uses the speed (action speed parameter) configured for each character to determine the order in which each character contained in the respective player deck and enemy deck acts after the start of the battle. In the present embodiment, both the player deck and enemy deck are composed of five characters. For this reason, along with acquiring the respective current speed of the five characters forming part of the player deck by referring to the proprietary character information illustrated in FIG. 5, the order-of-action determination processing module 212A acquires the respective speed configured for the five characters forming part of the enemy deck by referring to the enemy deck information illustrated in FIG. 8. Subsequently, as a result of comparing the respective magnitudes of the acquired speed, the order-of-action determination processing module 212A assigns an order of priority of 1 to 10 to each character and registers it in the action information illustrated in FIG. 11.

Next, once the order of action of the characters engaged in battle is determined in this manner, the player terminal 20 initiates a battle between the player deck and enemy deck and determines the respective action content of each character contained respectively in the player deck and in the enemy deck (Step S104). The process used to determine character action content is discussed in specific detail below.

Figure 15:
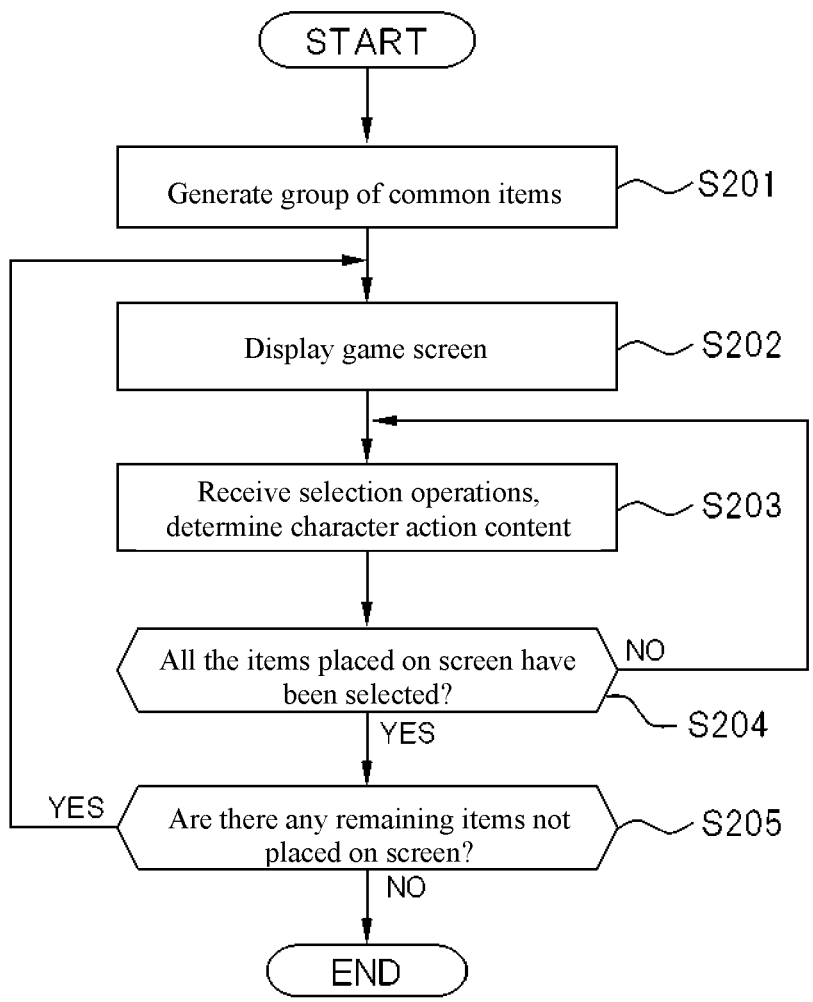
FIG. 15
A flow chart used to illustrate an example of operation relating to an action content determination process.

FIG. 15 is a flow chart used to illustrate an example of operation related to the action content determination process according to the present embodiment.

First, the action content determination processing module 212B of the player terminal 20 uses the multiple types of various items configured in the item information illustrated in FIG. 10 to generate a group of items common to the player and the player's opponent (Step S201).

Specifically, since there is a total of ten characters in the player deck and enemy deck, the action content determination processing module 212B of the player terminal 20 generates the group of common items using ten items. In addition, in the present embodiment, three types of items ("attack", "skill", "charge") are configured in the item information illustrated in FIG. 10. For this reason, the action content determination processing module 212B generates the group of common items composed of ten items by repeatedly selecting these three types of items at random, with duplication possible.

It should be mentioned that the action content determination processing module 212B may also vary the number of items used in the group of common items depending on at least either the number of the player's own characters used in battle by the player or the number of the enemy characters used in battle by the opponent. For example, if the number of characters contained in the player deck is 1 or if the number of characters contained in the enemy deck is 1, the group of common items may be generated using 8 items. In addition, for example, if the number of characters contained in each of the player deck and enemy deck is 1 character in each deck, the group of common items may be generated using 6 items. In this manner, restrictions preventing an excessive number of items from being selected may be applied by changing the number of the items while taking into account the number of characters contained in the decks. In the present embodiment, the group of common items is generated using a number of items that does not exceed the number of battle-enabled characters contained in the deck multiplied by 3. In addition, even if the number of characters contained in either one of the decks is 1, as a result of generating the group of common items such that this character can be selected a predetermined number of times (here, three times), the deck that is at a numerical disadvantage can be given an opportunity for a come-from-behind victory, and a decrease in the players' interest and excitement can be minimized even if there is a deviation in the number of surviving characters in the final stage of the battle.

Subsequently, after generating a group of common items in this manner, the screen generation processing module 213 of the player terminal 20 generates a game screen 60 used to determine the action content of each character by competitively selecting items from this group of common items in a non-duplicated manner. The game screen 60 generated by the screen generation processing module 213 is then displayed on the terminal display module 24. (Step S202).

Figure 16:
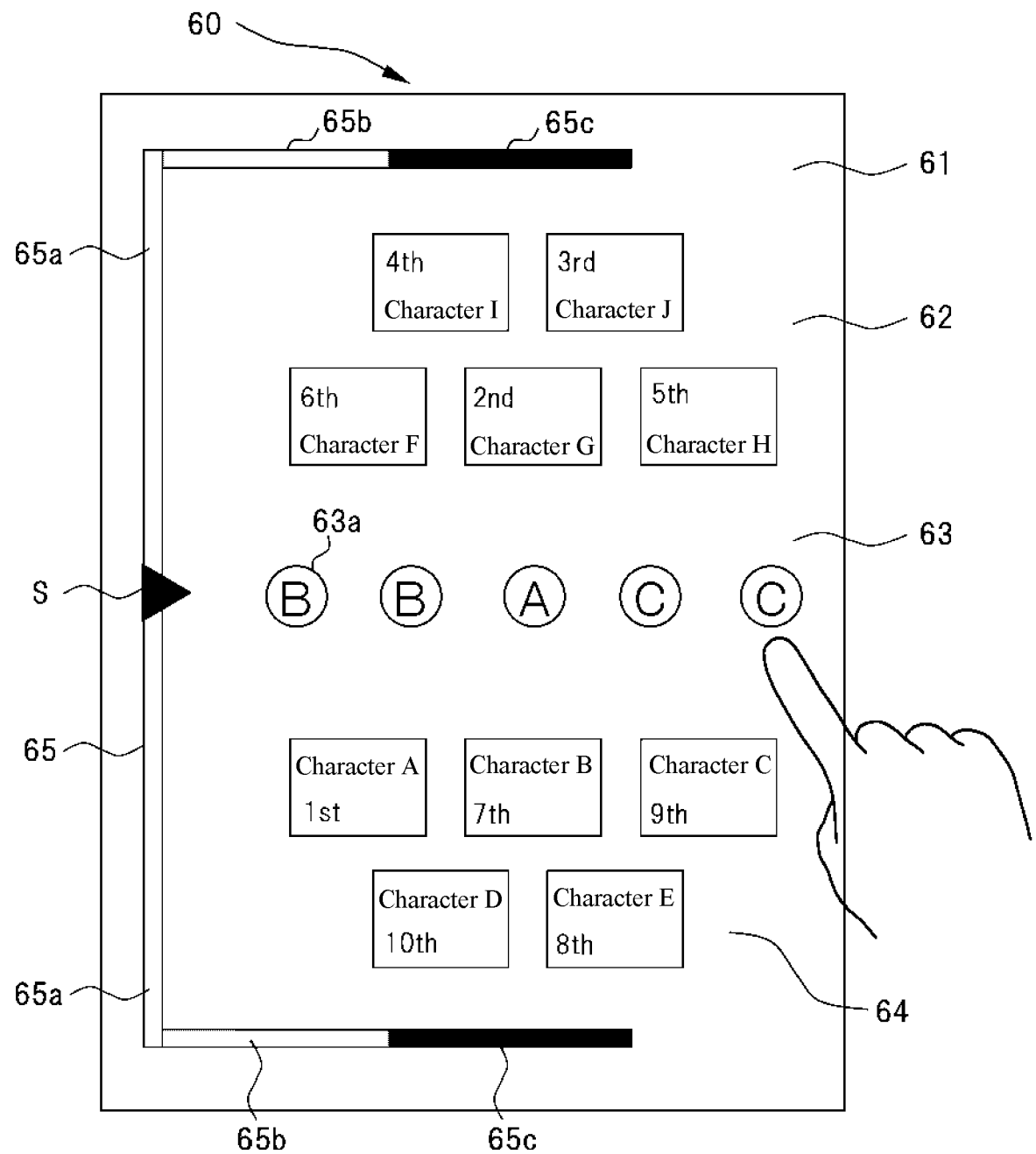
FIG. 16
A diagram illustrating an exemplary game screen 60.

FIG. 16 is a diagram illustrating an exemplary game screen 60. This game screen 60 includes a game field 61, an enemy deck placement area 62, an item group placement area 63, the player deck placement area 64, and an order-of-action display area 65.

The game field 61, which is an area where character battles are conducted, has an opponent-side area on the upper side of the screen and a player-side area on the lower side of the screen.

The enemy deck placement area 62, which is an area where multiple enemy characters used by the opponent in battle are placed side-by-side (in other words, an area where the enemy deck is placed), is located in the opponent-side area of the game field 61. Here, the order of action based on the action information illustrated in FIG. 11 ("2nd", etc.) is displayed in association with each character forming part of the enemy deck. It should be noted that the attributes and charge point values of the characters can also be displayed in association with each character forming part of the enemy deck.

The item group placement area 63, which is an area where the multiple items contained in the group of common items are placed side-by-side, is located in the center of the game field 61, sandwiched between the player deck and enemy deck. In the present embodiment, only a subset of items contained in the entire group of common items are placed side-by-side. Here, five items 63a out of the ten items contained in the group of common items are placed side-by-side. In addition, after selecting all of these five items 63a, the next five items are again placed there in a side-by-side arrangement. It should be mentioned that all of the ten items contained in the group of common items can also be placed side-by-side.

The player deck placement area 64, which is an area where the player's own multiple characters used in battle by the player are placed side-by-side (in other words, an area where the player deck is placed), is located in the player-side area of the game field 61. Here, the order of action based on the action information illustrated in FIG. 11 ("1st", etc.) is displayed in association with each character forming part of the player deck. It should be noted that the attributes and charge point values of the characters can also be displayed in association with each character forming part of the player deck.

The order-of-action display area 65, which is an area where the order of action of each character determined by the order-of-action determination processing module 212A is displayed, is located along the periphery of the game field 61. In the present embodiment, the order of action of the characters is displayed separately in the player-side area (the lower side of the screen) and in the opponent-side area (the upper side of the screen), with a start point S located therebetween. In addition, the order-of-action display area 65 according to the present embodiment is divided into a first order-of-action display area 65a, a second order-of-action display area 65b, and a third order-of-action display area 65c, and icons that indicate characters are placed in particular zones depending on the passes within a single round, during which the characters' actions are carried out. Here, providing an opportunity to carry out an action for each character, from the first to the last one (at the outset, the 10th one), in accordance with the order of action determined by the process of the above-mentioned Step S103 is referred to as "completing a single pass", and, in the present embodiment, during a single pass, each character can perform an action corresponding to one item associated with that character. For example, after performing an operation that associates three items selected by the player from the group of common items with a single character in a duplicated manner, the action corresponding to the initial first item is performed during the first pass and, consequently, an icon indicating the character performing the action corresponding to the first item is placed in the first order-of-action display area 65a. Since the action corresponding to the second item is performed during the second pass, an icon indicating the character performing the action corresponding to the second item is placed in the second order-of-action display area 65b. Furthermore, since the action corresponding to the final third item is performed during the third pass, an icon indicating the character performing the action corresponding to the third item is placed in the third order-of-action display area 65c. In this manner, the order of the actions corresponding to the ten items has to do not only with the order of action of the characters, but also with the order associated with a single character. Since all of the ten icons indicating the characters performing the actions corresponding to the items are displayed across the first through third order-of-action display areas 65a-65c in the order-of-action display area 65, the actual actions of the characters within a single round can be readily understood. It should be mentioned that it is possible to initially display only the first order-of-action display area 65a, with the display of the second order-of-action display area 65b and third order-of-action display area 65c triggered only when a second and third item is associated with a single character.

Referring back to FIG. 15, while this game screen 60 is displayed on the terminal display module 24, the action content determination processing module 212B of the player terminal 20 receives operations that select arbitrary items from the group of common items as input from the player and the player's opponent in an alternating manner and determines the action content of each character (Step S203).

Specifically, while the game screen 60 illustrated in FIG. 16 is displayed, the action content determination processing module 212B of the player terminal 20, upon receiving, from the player, an operation whereby an arbitrary item that has not been selected by the opponent is selected from the multiple items arranged side-by-side in the item group placement area 63 and an operation whereby the player's own character associated with this selected item is selected from among the multiple characters placed side-by-side in the player deck placement area 64, determines the selected action content of the player's own character as the action content corresponding to this selected item and updates the action content configured in the player deck information illustrated in FIG. 6 as well as in the action information illustrated in FIG. 11. In addition, upon receiving, from the opponent, an operation whereby an arbitrary item that has not been selected by the player is selected from the multiple items arranged side-by-side in the item group placement area 63 and an operation whereby an enemy character associated with this selected item is selected from among the multiple characters placed side-by-side in the enemy deck placement area 62, the selected action content of this enemy character is determined as the action content corresponding to the selected item and the action content configured in the enemy deck information illustrated in FIG. 8 as well as in the action information illustrated in FIG. 11 is updated.

Figure 17:
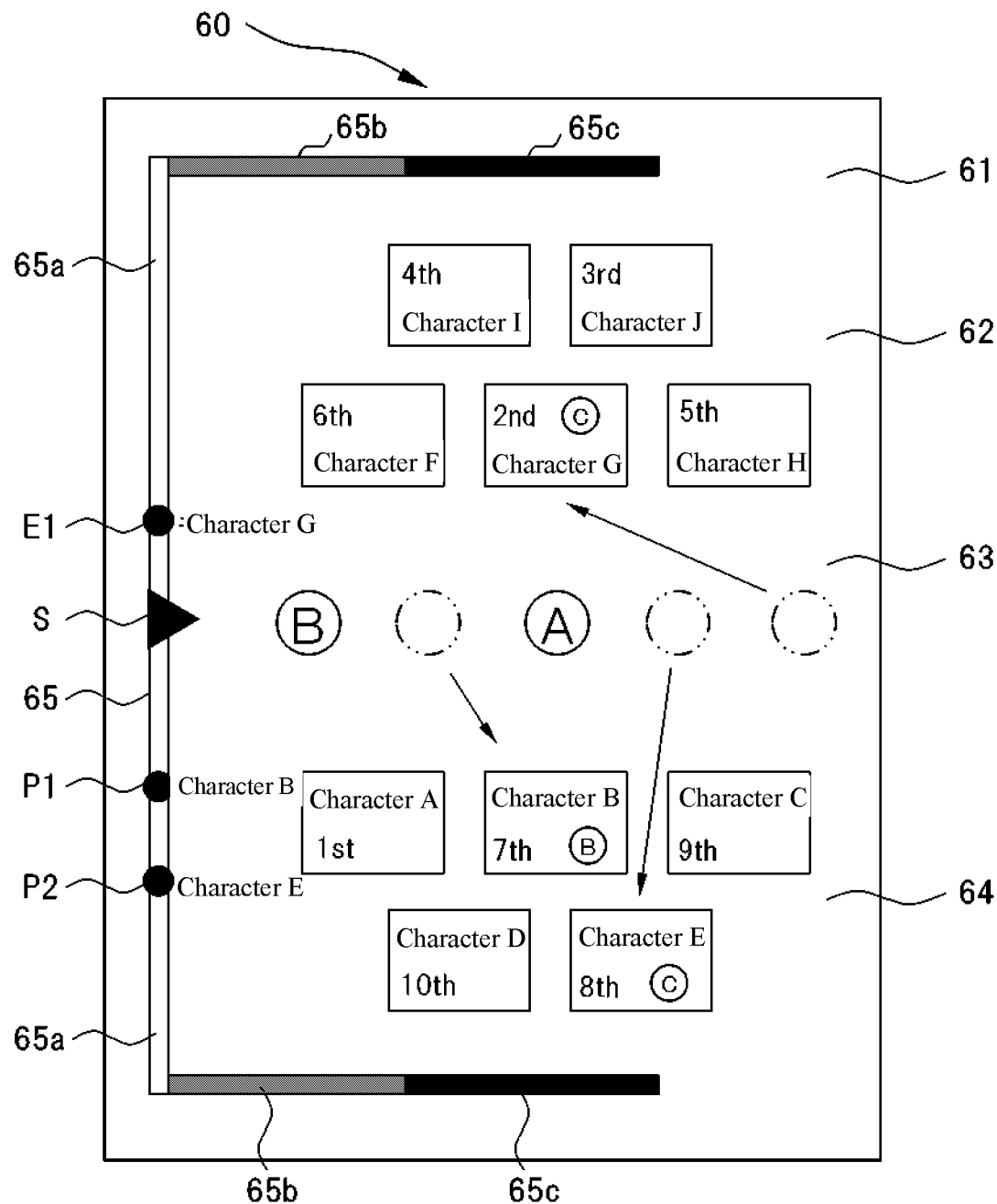
FIG. 17

FIG. 17 is a diagram illustrating a first specific example of character action content determination. Here, the diagram illustrates a game situation in which the player selects an item first and then the opponent selects an item on the game screen illustrated in FIG. 16.

During the first item selection, first the player associates "Item B" selected from the item group placement area 63 with "Character B" selected from the player deck placement area 64 by performing a dragging operation that involves indicating the position of "Item B" and, in immediate succession, indicating the location of "Character B" on screen. Then, as shown in FIG. 10, a "skill" is associated with "Item B" as action content. For this reason, as a result of associating "Item B", the action content of "Character B" is determined to be a "skill" and then configured and registered in the player deck information illustrated in FIG. 6 as well as in the action information illustrated in FIG. 11.

At such time, as a result of having been selected by the player, this "Item B" is deleted from the item group placement area 63 thereby preventing the opponent from selecting it. In addition, after setting the action content of "Character B" to "skill" as a result of associating "Item B", an icon P1 corresponding to "Character B", which is intended to activate this "skill", is placed in the player-side area of the order-of-action display area 65. It should be noted that since the order of action of "Character B" is "seventh ("7th")", it is in second place in terms of order in the player deck (1: "Character A" (1st)>2: "Character B" (7th)>3: "Character E" (8th)>4: "Character C" (9th)>5: "Character D" (10th)). For this reason, an icon, P1, which corresponds to "Character B", is displayed at a location spaced away from the start point S toward the bottom of the screen by a distance corresponding to the second place.

Subsequently, when the system switches over to the opponent and the opponent associates "Item C" selected from the item group placement area 63 with "Character G" selected from the enemy deck placement area 62, the action content of "Character G" is set to "charge" in accordance with the item information illustrated in FIG. 10 and then configured and registered in the enemy deck information illustrated in FIG. 8 as well as in the action information illustrated in FIG. 11. Note that, as shown in FIG. 10, a "charge point value (+2)" is associated with "Item C". For this reason, two points are added to the "charge points" of "Character G" in the action information illustrated in FIG. 11.

At such time, as a result of having been selected by the opponent, this "Item C" is deleted from the item group placement area 63, thereby preventing the player from selecting it. In addition, after setting the action content of "Character G" to "charge" as a result of associating "Item C", an icon, E1, corresponding to "Character G", which is intended to perform this "charge", is placed in the opponent-side area of the order-of-action display area 65. It should be noted that since the order of action of "Character G" is "second ("2nd")", it is in first place in terms of order in the enemy deck (1: "Character G" (2nd)>2: "Character J" (3rd)>3: "Character I" (4th)>4: "Character H" (5th)>5: "Character F" (6th)). For this reason, an icon, E1, which corresponds to "Character G", is displayed at a location spaced away from the start point S toward the top of the screen by a distance corresponding to the first place.

During the subsequent second item selection, when the system switches over to the player and this player associates "Item C" selected from the item group placement area 63 with "Character E" selected from the player deck placement area 64, the action content of the "Character E" is set to "charge" and then configured and registered in the player deck information illustrated in FIG. 6 as well as in the action information illustrated in FIG. 11. In addition, two points are added to the "charge points" of "Character E" in the action information illustrated in FIG. 11.

At such time, as a result of having been selected by the player, this "Item C" is deleted from the item group placement area 63, thereby preventing the opponent from selecting it. In addition, after setting the action content of "Character E" to "charge" as a result of associating "Item C", an icon, P2, corresponding to "Character E", which is intended to perform this "charge", is placed in the player-side area of the order-of-action display area 65. It should be noted that since the order of action of "Character E" is "eighth ("8th")", it is in third place in terms of order in the player deck. For this reason, an icon, P2, which corresponds to "Character E", is displayed at a location spaced away from the start point S toward the bottom of the screen by a distance corresponding to the third place.

In this manner, the action content of each character engaged in battle is determined by the fact that the player and their opponent competitively select items (character action content, i.e., "operational commands") from the group of common items.

Figure 18:
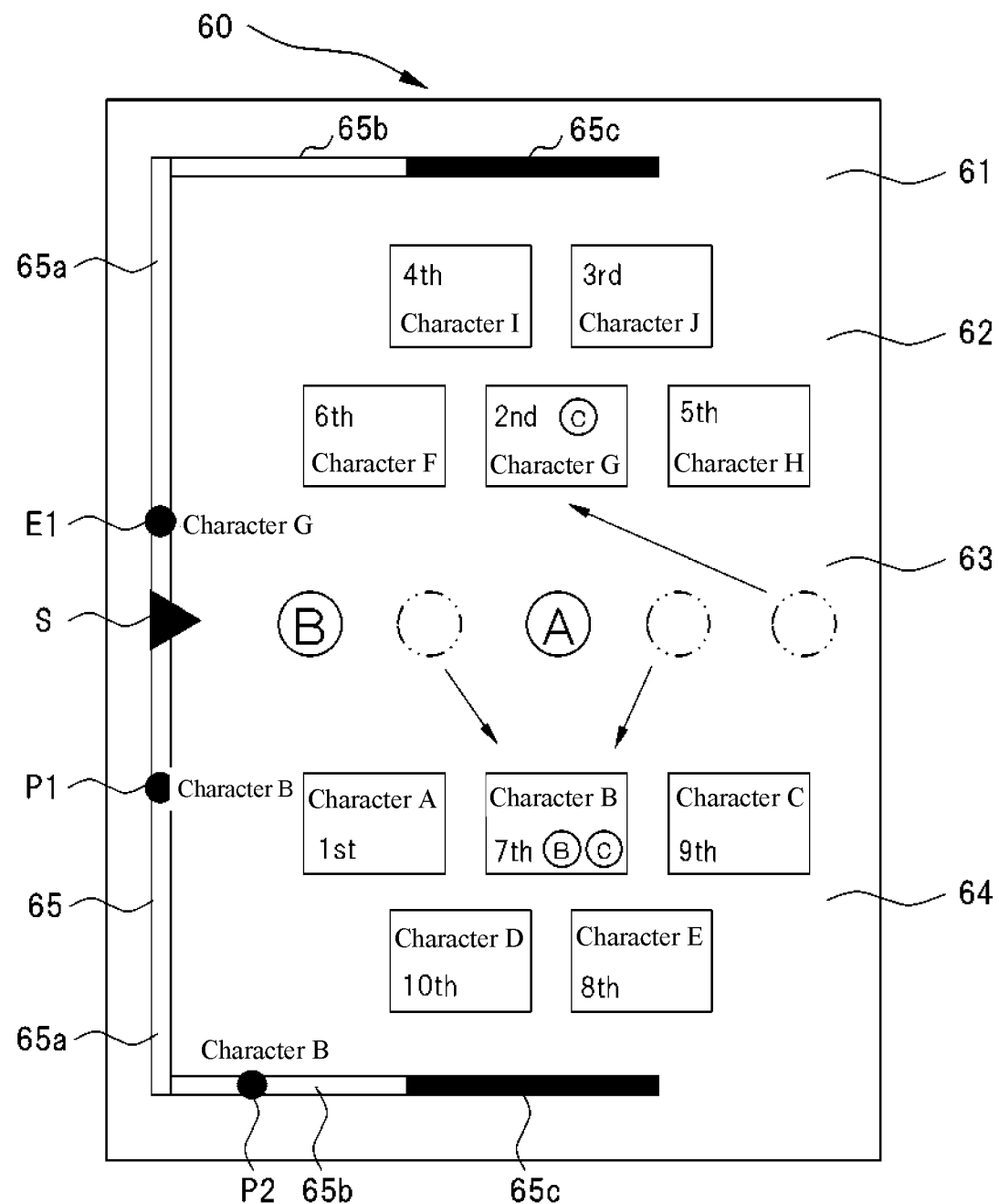

FIG. 18 is a diagram illustrating a second specific example of character action content determination. Here, the diagram illustrates a game situation in which, after the player selects an item and then the opponent selects an item on the game screen 60 illustrated in FIG. 16, the player associates two or more items with one character in a duplicated manner.

During the first item selection in a certain round, when the player first associates "Item B" selected from the item group placement area 63 with "Character B" selected from the player deck placement area 64, the action content of "Character B" is set to "skill" and then configured and registered in the player deck information illustrated in FIG. 6 as well as in the action information illustrated in FIG. 11.

At such time, as a result of having been selected by the player, this "Item B" is deleted from the item group placement area 63. In addition, this "Item B" is the initial first item associated with "Character B". The action corresponding to the initial first item is carried out during the first pass. For this reason, an icon, P1, corresponding to "Character B", which is intended to activate this "skill", is placed in the player-side area of the first order-of-action display area 65a.

Subsequently, when the system switches over to the opponent and the opponent associates "Item C" selected from the item group placement area 63 with "Character G" selected from the enemy deck placement area 62, the action content of "Character G" is set to "charge" and then configured and registered in the enemy deck information illustrated in FIG. 8 as well as in the action information illustrated in FIG. 11.

At such time, as a result of having been selected by the opponent, this "Item C" is deleted from the item group placement area 63. In addition, this "Item C" is the initial first item associated with "Character G". The action corresponding to the initial first item is carried out during the first pass. For this reason, an icon, E1, corresponding to "Character G", which is intended to perform this "charge", is placed in the opponent-side area of the first order-of-action display area 65a.

During the subsequent second item selection, the system switches over to the player again, and when this player associates "Item C" selected from the item group placement area 63 with "Character B" selected from the player deck placement area 64, the action content of "Character B" is set to "charge" and then configured and registered in the player deck information illustrated in FIG. 6 as well as in the action information illustrated in FIG. 11.

At such time, as a result of having been selected by the player, this "Item C" is deleted from the item group placement area 63. In addition, this "Item C" is the second item associated with "Character B". The action corresponding to the second item is carried out during the second pass. For this reason, an icon, P2, corresponding to "Character B", which is intended to perform this "charge", is placed in the player-side area of the second order-of-action display area 65b.

In this manner, as a result of associating two or more items with one character, two or more action content elements can be set up for one character. In such a case, the presence of characters that are not associated with any particular items among the characters forming part of the deck is permitted, but these characters are put in standby mode and not allowed to act.

Referring back to FIG. 15, subsequently, the action content determination processing module 212B of the player terminal 20 determines whether or not all the multiple items arranged side-by-side in the item group placement area 63 on the game screen 60 illustrated in FIG. 16 have been selected by the player and the opponent (Step S204).

As a result of this determination, in the event that all the multiple items arranged side-by-side in the item group placement area 63 have not been selected yet (Step S204: NO), the system goes back to the process of the above-described Step S203 and receives further selection operations from the player or opponent. By contrast, if all the multiple items arranged side-by-side in the item group placement area 63 have been selected (Step S204: YES), the system advances to the process of the next Step S205.

Subsequently, the action content determination processing module 212B of the player terminal 20 determines whether or not there are any remaining items not arranged side-by-side in the item group placement area 63 from among all the items contained in the group of common items (Step S205).

As a result of this determination, in the event that there are no remaining items not arranged side-by-side in the item group placement area 63 (in other words, the case in which all the items contained in the group of common items have already been arranged side-by-side), the process is terminated (Step S205: NO). On the other hand, if there are remaining items not arranged side-by-side in the item group placement area 63 (Step S205: YES), the system goes back to Step S202, and the remaining items contained in the group of common items (for example, the remaining five items that have not been placed side-by-side among the ten items contained in the group of common items) are placed side-by-side in the item group placement area 63.

Referring back to FIG. 12, subsequently, after determining the action content of each character engaged in battle in this manner, the player terminal 20 causes each character to initiate the action content determined by the process of the above-described Step S104 in sequence, starting from the first action, in accordance with the order of action determined by the process of the above-mentioned Step S103 (Step S105).

Specifically, the action content execution processing module 212C of the player terminal 20 causes each character contained in the player deck and enemy deck to act in accordance with the order of action and action content configured in the action information illustrated in FIG. 11. In the present embodiment, the actions corresponding to the ten items respectively selected from the group of common items are initiated in sequence. If each of the ten characters is associated with one item, then all the actions of the ten characters are carried out based on the order of action during the first pass within a single round. If some characters are associated with two or more items, the action corresponding to the first item is carried out during the first pass within a single round, and the actions corresponding to the second and subsequent items are carried out respectively during the second and subsequent passes within a single round. If there are characters that have not been associated with any items (in other words, characters whose action content has not been configured in the action information illustrated in FIG. 11), they remain in standby mode and do not act even when the player's own turn to act arrives.

In addition, the action content execution processing module 212C according to the present embodiment determines the opponent characters that are attack targets for characters having "attack" or "skill" configured therefor as action content. At such time, the opponent's character with the lowest hit point value (HP) among the characters contained in the opponent's deck is automatically selected as the attack target. On the other hand, the action content execution processing module 212C according to the present embodiment awards 2 points worth of "charge points" to the character having "charge" configured therefor as action content. Accordingly, there is no need to determine the opponent's character that will be the attack target.

In addition, the action content execution processing module 212C according to the present embodiment causes the characters whose "charge point" value has reached a maximum level among the characters having "attack" configured therefor as action content to activate a special attack instead of an ordinary attack. In the same manner, the characters whose "charge point" value has reached a maximum level among the characters having "skill" configured therefor as action content are caused to activate a special skill instead of an ordinary skill.

Subsequently, the player terminal 20 determined whether or not either the player deck or the enemy deck has been completely destroyed (Step S106).

Namely, the battle processing module 212 of the player terminal 20 refers to the player deck information illustrated in FIG. 6 to identify each character forming part of the player deck. The battle processing module 212 then refers to the hit point parameters configured in the proprietary character information illustrated in FIG. 5 to determine whether or not all the hit point parameters of the identified characters forming part of the player deck are equal to or less than a predetermined value (for example, zero or less). In addition, the battle processing module 212 refers to the hit point parameters configured in the enemy deck information illustrated in FIG. 8 to determine whether or not all the hit point parameters of the characters forming part of the enemy deck are equal to or less than a predetermined value (for example, zero or less).

If, as a result of this determination, it is determined that either the player deck or the enemy deck has been completely destroyed (Step S106: YES), the process is terminated. By contrast, if it is determined that neither deck has been completely destroyed (Step S106: NO), the current round is terminated, the system goes back to the process of the above-mentioned Step S103, transitions to the next round, and determines the order of action of the characters again. At such time, there is no variation in the speed (action speed parameter) configured for each character in the same quest. For this reason, the order-of-action determination processing module 212A of the player terminal 20 adopts an order of action obtained by removing the characters whose hit point parameters have become equal to or less than a predetermined value (for example, zero or less) (in other words, the characters defeated by the opponent). It should be noted that content permitting variation in the action speed parameter may be provided in action content such as "attack" and "skill", and the order of action may be redefined in accordance with the action speed parameters of the characters surviving at the start of every round. In this case, if action content permitting variation in the action speed parameter is carried out during the previous round, the order of action in the current round is not a mere replication of the order of the surviving characters and may involve some rearrangements.

As described above, the game system 1 according to the present embodiment makes it possible to determine the action content of each character contained in the player deck and enemy deck by competitively selecting items (character action content, i.e., "operational commands") from the group of common items in a non-duplicated manner. This can enhance the strategic texture provided by the competitive selection of items. For example, when the player first selects "Item A", which corresponds to "attack", on the game screen 60 illustrated in FIG. 16 and configures it for "Character B" ("7th") first, even though the order of action of the opponent's own "Character G" ("2nd") has priority, the opponent can no longer make "Character G" carry out the "attack" corresponding to this already-selected "Item A". Therefore, it becomes possible to increase the players' interest and excitement because such a strategy can be used even if the order of action of the characters has been determined.

In addition, since the order of action applicable to all the characters forming part of the player deck and enemy deck is displayed in a manner understandable to the player, the strategic texture of item selection tactics can be further enhanced when the player and the player's opponent competitively select items from the group of common items. For example, when the player is deciding which character on the game screen 60 illustrated in FIG. 16 should be configured with "Item A", which corresponds to "attack", it turns out that if "Character A" ("1st") is configured, then it can be allowed to act before any of the opponent's characters. Therefore, during the phase involving actual action based on action content, as a result of an "attack" of "Character A" before any action on the part of the opponent's character, damage can be inflicted on the opponent's character associated with the item, and if this character is defeated, the action opportunities of the associated item can be taken over from the opponent. Thus, it becomes possible to increase the players' interest and excitement because such strategy can be used even if the order of action of the characters has been determined.

In addition, during a single round, multiple items can be associated with a single character. In the present embodiment, up to 3 action content elements can be configured per one character, the action corresponding to the second item associated with said character is carried out after a single pass of actions corresponding to the first items associated with each character forming part of the player deck and enemy deck in accordance with the order of action, and the action corresponding to the third item associated with said character is carried out after a single pass of actions corresponding to the second items associated with each character in accordance with the order of action. Although actions corresponding to all the items associated with a single character may be carried out during the first pass, in the present embodiment, actions corresponding to the second and third items are carried out, respectively, during the second and third pass, and, for this reason, the order of action of the characters is not limited to just one pass and the strategic breadth is expanded, and, as a result, it becomes possible to increase the players' interest and excitement.

It should be noted that it is possible not to carry out the actions corresponding to all the items of the group of common items during a single round, and, instead, it is possible to perform only the actions corresponding to the first pass during the current round and carry over the actions corresponding to the second and third passes respectively to the next and subsequent rounds. In such a case, the actions of the second and third passes of the current round are transferred as the actions of the first and second passes of the next round. For example, if three items are associated with a single character during the first round, then, during the first round, the actions corresponding to all the items are not carried out, and, instead, only the actions corresponding to the first item are performed during the first round and the actions corresponding to the second and third items are respectively reserved as the actions to be performed during the second and third round. In this manner, carrying-over actions spanning multiple rounds produces a feeling of uninterrupted suspense. In addition, since there is a limit to the number of items associated with a single character, items can be uniformly associated with the characters forming part of the decks.

Other Embodiments

The foregoing embodiment, which is intended to facilitate the understanding of the present invention, is not to be construed as limiting of the present invention. The present invention can be modified and improved without departing from its spirit and, at the same time, includes equivalents thereto. In particular, the embodiments described below are also included in the present invention.
<Action Content Determination>

Although the present embodiment as described above has been discussed with reference to a case in which the player can select characters associated with items from the player deck in a discretionary manner, the present invention is not limited thereto. For example, the action content determination processing module 212B may determine the action content of each character by associating items selected by the player and their opponent from the group of common items sequentially, starting from the first character, in accordance with the order of action determined by the order-of-action determination processing module 212A. In such a case, there won't be any characters without any items associated therewith (in other words, characters having no action content configured in the action information of FIG. 11) and, therefore, it won't be necessary for them to remain in standby mode and be prevented from acting even when the player's own turn to act arrives (in other words, they will definitely act when the player's own turn to act arrives).
<Determination of the Order of Action>

Although the present embodiment as described above has been discussed with reference to a case in which the order-of-action determination processing module 212A determines the order of action of each character contained in the respective player deck and enemy deck after the start of the battle based on the speed (action speed parameter) configured for each character, the present invention is not limited thereto. For example, it is also possible to introduce changes into the order of action of the characters by multiplying the speed (action speed parameter) configured for each character by predetermined coefficients depending on the game situation.
<Determination of Attack Target>

Although the present embodiment as described above has been discussed with reference to a case in which the action content execution processing module 212C automatically selects the character with the lowest "hit point (HP)" value among the opponent's characters contained in the opponent's deck when determining the attack target for characters having "attack" or "skill" configured as action content, the present invention is not limited thereto. For example, it is also possible to select a character at random from the characters contained in the opponent's deck. In addition, it is also possible to allow the player to select the opponent's character to be an attack target in a discretionary manner. In addition, only in those cases where a "special attack" or "special skill" is activated, a character that can be defeated with a single blow in the most efficient manner may be automatically selected from among the characters contained in the opponent's deck. Specifically, when the opponent's deck contains Character A with a remaining "hit point (HP)" value of 10 points, Character B with a remaining "hit point (HP)" value of 50 points, Character C with a remaining "hit point (HP)" value of 70 points, and Character D with a remaining "hit point (HP)" value of 100 points, Character C is automatically selected as the attack target if it is assumed that a damage of 80 points can be inflicted by the "special attack". In this manner, the damage inflicted on the opponent's character as a result of the current attack is calculated in advance and, should the efficiency of inflicting damage take precedence, Character D would be the one to be selected as the attack target, but, as a result of giving priority to the efficiency of defeat, Character C, which can be reliably defeated even though 10 points of damage are wasted, is selected as the attack target. Furthermore, in addition, it is also possible to take the level (rank) of the players into consideration and select a character that is advantageous (or disadvantageous) to the players depending on this level (rank) as the final attack target. In addition, it is also possible to determine the final attack target by taking the players' selections into account.
<Game Content>

Although the present embodiment as described above has been discussed with reference to character cards, the present invention is not limited thereto. For example, as long as game content is represented by electronic game data, it may involve the characters themselves, figures, as well as tools, abilities and other items used in the game.
<Information Processing Devices>

Although the game system 1 according to the present embodiment as described above has been discussed with reference to a case in which player terminals 20, as an example of information processing devices, execute information processing operations of various types based on a non-transitory computer-readable medium including instructions to be performed on a processor (e.g., game program), the present invention is not limited thereto. For example, the server device 10 may itself be adapted to execute the various types of information processing operations described above in accordance with such a non-transitory computer-readable medium including instructions to be performed on a processor (e.g., game program). In addition, a configuration may be used in which, for example, the server device 10 supports some of the information processing device functionality. In this case, the server device 10 and the player terminals 20 constitute an information processing device. It should be noted that the information processing device is, for example, a computer provided with a processor and a memory.

DESCRIPTION OF THE REFERENCE NUMERALS

1 Game system
2 Network
10 Server device
11 Control module
12 Memory module
13 Input module
14 Display module
15 Communication module
20 Player terminal
21 Terminal control module
22 Terminal memory module
23 Terminal input module
24 Terminal display module
25 Terminal communication module
50 Deck assembly screen
51 Deck frame display area
52 Constituent character display area
53 Frame attribute display area
55 Quest selection screen
56 Control button
60 Game screen
61 Game field
62 Enemy deck placement area
63 Item group placement area
63a Item
64 Player deck placement area
65 Order-of-action display area
65a First order-of-action display area
65b Second order-of-action display area
65c Third order-of-action display area
111 Data management module
211 Deck assembly processing module
212 Battle processing module
212A Order-of-action determination processing module
212B Action content determination processing module
212C Action content execution processing module
213 Screen generation processing module
E1 Icon
P1 Icon
P2 Icon
S Point

The invention claimed is:

1. An information processing device, comprising:
a player terminal configured to:
perform action content determination processing to determine the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while allowing the opponent to perform an operation whereby an arbitrary item that has not been selected by the player is selected from the group of common items and an operation whereby this selected item is associated with the opponent's own character used in battle;
perform order-of-action determination processing, to determine the order of action of the characters based on the action speed parameter configured for each respective character engaged in battle; and
perform action content execution processing, which, upon selection of all the items from the group of common items, causes each character engaged in battle to act based on the character action content corresponding to the respectively associated items in accordance with the determined order of action of the characters;
wherein, at the player terminal, image generation processing is performed so as to generate a game screen having an item group placement area where the multiple items contained in the group of common items are placed side-by-side and a player character placement area where the player's own multiple characters used in battle by the player are placed side-by-side; and,
while the game screen is displayed, the action content determination processing allows the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus determines the action content of the player's own selected character;
wherein the image generation processing generates the aforementioned game screen that has an order-of-action display area, which includes a player-side area and an opponent-side area, and in which the order of action of each character engaged in battle determined by the order-of-action determination processing is displayed in a subdivided manner on the player's side and on the opponent's side, and,
when the player performs an operation whereby the player's own character associated with an item selected from the item group placement area is selected from the player character placement area, an icon showing the player's own selected character is placed in the player-side area of the order-of-action display area in a side-by-side arrangement in accordance with the order of action.

2. The information processing device according to claim 1, wherein
the action content determination processing allows the player to perform an operation that associates two or more items selected from the group of common items with one of the player's own characters, thereby determining two or more action content elements for the player's own character, and
the action content execution processing causes the player's own character to act based on the character action content corresponding to the first item during a first pass when the actions of each character engaged in battle are initially carried out, and causes the player's own character to act based on the character action content corresponding to the second and subsequent items during the second and subsequent passes following the first pass.

3. The information processing device according to claim 2,
wherein there the player terminal is configured to perform image generation processing that generates a game screen having an order-of-action display area that shows the order of action of each character engaged in battle as determined by an order-of-action determination processing, and
wherein, upon performing an operation that associates two or more items selected by the player from the group of common items with one of the player's own characters, the image generation processing, in accordance with the order of action, places an icon that shows one of the player's own characters performing an action corresponding to the first item in the area of the order-of-action display area that corresponds to the first pass, and, in accordance with the order of action, places icons that show one of the player's own characters performing actions corresponding to the second and subsequent items in the areas of the order-of-action display area that correspond, respectively, to the second and subsequent passes.

4. The information processing device according to claim 3,
wherein the image generation processing generates a game screen additionally having an item group placement area where the multiple items contained in the group of common items are placed side-by-side and a player character placement area where the player's own multiple characters used in battle by the player are placed side-by-side; and,
while the game screen is displayed, the action content determination processing allows the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus determines the action content of the player's own selected character.

5. The information processing device according to claim 1, wherein the action content determination processing varies the number of items used in the group of common items depending on at least either the number of the player's own characters used in battle by the player or the number of the opponent's own characters used in battle by the opponent.

6. A non-transitory computer-readable medium configured to execute instructions via a processor, the instructions comprising:
an action content determination process, which determines the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while allowing the opponent to perform an operation whereby an arbitrary item that has not been selected by the player is selected from the group of common items and an operation whereby this selected item is associated with the opponent's own character used in battle;
an order-of-action determination process, which determines the order of action of the characters based on the action speed parameter configured for each respective character engaged in battle; and
an action content execution process, whereby, upon selection of all the items from the group of common items, each character engaged in battle is caused to act based on the character action content corresponding to the respectively associated items in accordance with the determined order of action of the characters;
wherein an image generation process is performed so as to generate a game screen having an item group placement area where the multiple items contained in the group of common items are placed side-by-side and a player character placement area where the player's own multiple characters used in battle by the player are placed side-by-side; and,
while the game screen is displayed, the action content determination process allows the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus determines the action content of the player's own selected character;
wherein the image generation process generates the aforementioned game screen that has an order-of-action display area, which includes a player-side area and an opponent-side area, and in which the order of action of each character engaged in battle determined by the order-of-action determination process is displayed in a subdivided manner on the player's side and on the opponent's side, and,
when the player performs an operation whereby the player's own character associated with an item selected from the item group placement area is selected from the player character placement area, an icon showing the player's own selected character is placed in the player-side area of the order-of-action display area in a side-by-side arrangement in accordance with the order of action.

7. The non-transitory computer-readable medium according to claim 6, wherein
the action content determination process allows the player to perform an operation that associates two or more items selected from the group of common items with one of the player's own characters, thereby determining two or more action content elements for the player's own character, and
the action content execution process causes the player's own character to act based on the character action content corresponding to the first item during a first pass when the actions of each character engaged in battle are initially carried out, and causes the player's own character to act based on the character action content corresponding to the second and subsequent items during the second and subsequent passes following the first pass.

8. The non-transitory computer-readable medium according to claim 7,
further comprising an wherein image generation process that generates a game screen having an order-of-action display area that shows the order of action of each character engaged in battle as determined by an order-of-action determination process, and wherein, upon performing an operation that associates two or more items selected by the player from the group of common items with one of the player's own characters, the image generation process, in accordance with the order of action, places an icon that shows one of the player's own characters performing an action corresponding to the first item in the area of the order-of-action display area that corresponds to the first pass, and, in accordance with the order of action, places icons that show one of the player's own characters performing actions corresponding to the second and subsequent items in the areas of the order-of-action display area that correspond, respectively, to the second and subsequent passes.

9. The non-transitory computer-readable medium according to claim 8, wherein the image generation process generates a game screen additionally having an item group placement area where the multiple items contained in the group of common items are placed side-by-side and a player character placement area where the player's own multiple characters used in battle by the player are placed side-by-side; and, while the game screen is displayed, the action content determination process allows the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus determines the action content of the player's own selected character.

10. The non-transitory computer-readable medium according to claim 6, wherein the action content determination process varies the number of items used in the group of common items depending on at least either the number of the player's own characters used in battle by the player or the number of the opponent's own characters used in battle by the opponent.

11. A computer-implemented method performed by a processor, the computer-implemented method comprising:

determining the action content of each character engaged in battle by generating a group of items common to the player and the player's opponent using multiple types of various items, to which character action content respectively corresponds, and by allowing the player to perform an operation whereby an arbitrary item that has not been selected by the opponent is selected from the group of common items and an operation whereby this selected item is associated with the player's own character used in battle, while allowing the opponent to perform an operation whereby an arbitrary item that has not been selected by the player is selected from the group of common items and an operation whereby this selected item is associated with the opponent's own character used in battle;

determining the order of action of the characters based on the action speed parameter configured for each respective character engaged in battle; and, upon selection of all the items from the group of common items, causing each character engaged in battle to act based on the character action content corresponding to the respectively associated items in accordance with the determined order of action of the characters;

wherein, at the player terminal, image generation processing is performed so as to generate a game screen having an item group placement area where the multiple items contained in the group of common items are placed side-by-side and a player character placement area where the player's own multiple characters used in battle by the player are placed side-by-side; and, while the game screen is displayed, the action content determination processing allows the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus determines the action content of the player's own selected character;

wherein the image generation processing generates the aforementioned game screen that has an order-of-action display area, which includes a player-side area and an opponent-side area, and in which the order of action of each character engaged in battle determined by the order-of-action determination processing is displayed in a subdivided manner on the player's side and on the opponent's side, and, when the player performs an operation whereby the player's own character associated with an item selected from the item group placement area is selected from the player character placement area, an icon showing the player's own selected character is placed in the player-side area of the order-of-action display area in a side-by-side arrangement in accordance with the order of action.

12. The computer-implemented method according to claim 11, wherein the action content determination processing allows the player to perform an operation that associates two or more items selected from the group of common items with one of the player's own characters, thereby determining two or more action content elements for the player's own character, and the action content execution processing causes the player's own character to act based on the character action content corresponding to the first item during a first pass when the actions of each character engaged in battle are initially carried out, and causes the player's own character to act based on the character action content corresponding to the second and subsequent items during the second and subsequent passes following the first pass.

13. The computer-implemented method according to claim 12, wherein there the player terminal is configured to perform image generation processing that generates a game screen having an order-of-action display area that shows the order of action of each character engaged in battle as determined by an order-of-action determination processing, and wherein, upon performing an operation that associates two or more items selected by the player from the group of common items with one of the player's own characters, the image generation processing, in accordance with the order of action, places an icon that shows one of the player's own characters performing an action corresponding to the first item in the area of the order-of-action display area that corresponds to the first pass, and, in accordance with the order of action, places icons that show one of the player's own characters performing actions corresponding to the second and subsequent items in the areas of the order-of-action display area that correspond, respectively, to the second and subsequent passes.

14. The computer-implemented method according to claim 13, wherein the image generation processing generates a game screen additionally having an item group placement area where the multiple items contained in the group of common items are placed side-by-side and a player character placement area where the player's own multiple characters used in battle by the player are placed side-by-side; and, while the game screen is displayed, the action content determination processing allows the player to perform an operation whereby an arbitrary item that has not been selected by the opponent is selected from the multiple items arranged side-by-side in the item group placement area and an operation whereby the player's own character associated with this selected item is selected from among the multiple characters placed side-by-side in the player character placement area, and thus determines the action content of the player's own selected character.

* * * * *